(12) United States Patent
Qian et al.

(10) Patent No.: US 9,763,109 B2
(45) Date of Patent: Sep. 12, 2017

(54) METHOD AND APPARATUS FOR ANALYZING SIGNALING TRAFFIC

(71) Applicant: Huawei Technologies Co., Ltd.

(72) Inventors: Li Qian, Shenzhen (CN); Wun Wah Edmond Chan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 14/140,380

(22) Filed: Dec. 24, 2013

(65) Prior Publication Data

US 2014/0105032 A1    Apr. 17, 2014

Related U.S. Application Data

(63) Continuation of application No. PCT/CN2013/071089, filed on Jan. 29, 2013.

(30) Foreign Application Priority Data

Jun. 13, 2012 (CN) .......................... 2012 1 0195008

(51) Int. Cl.
*H04W 24/00* (2009.01)
*H04L 1/24* (2006.01)
(Continued)

(52) U.S. Cl.
CPC ............... *H04W 24/00* (2013.01); *H04L 1/24* (2013.01); *H04L 63/1425* (2013.01); *H04W 12/00* (2013.01); *H04L 63/1458* (2013.01)

(58) Field of Classification Search
None
See application file for complete search history.

(56) References Cited

U.S. PATENT DOCUMENTS

| 2006/0028992 | A1 | 2/2006 | Kangru |
| 2006/0068712 | A1 | 3/2006 | Kroboth et al. |

(Continued)

FOREIGN PATENT DOCUMENTS

| CN | 1735040 A | 2/2006 |
| CN | 1753540 A | 3/2006 |

(Continued)

OTHER PUBLICATIONS

Patrick P.C. Lee, et al., "On the detection of signaling DoS attacks on 3G/WiMax wireless networks", Computer Networks, vol. 53, No. 15, Oct. 12, 2009, p. 2601-2616.

(Continued)

*Primary Examiner* — Andrew Lai
*Assistant Examiner* — Jamaal Henson

(57) ABSTRACT

A method and an apparatus for analyzing signaling traffic are disclosed by the embodiments of the present invention, which relate to the field of wireless communications, and are capable of analyzing signaling traffic and obtaining an analysis result. The method of the present invention includes: obtaining the number of signaling messages generated in the process that a terminal device transmits a packet according to user-plane data of the terminal device, where the user-plane data includes an interval between packets transmitted by a terminal device or the length of each packet transmitted by the terminal device; and analyzing the number of signaling messages generated in the process that the terminal device transmits a packet and obtaining an analysis result, where the analysis result includes address information about a terminal device that generates anomaly signaling traffic and/or characteristic information that affects signaling traffic.

8 Claims, 5 Drawing Sheets

(51) Int. Cl.
*H04L 29/06* (2006.01)
*H04W 12/00* (2009.01)

(56) References Cited

U.S. PATENT DOCUMENTS

| | | | | |
|---|---|---|---|---|
| 2006/0230450 | A1* | 10/2006 | Bu | H04L 63/1416 726/22 |
| 2007/0121596 | A1* | 5/2007 | Kurapati | H04L 29/06027 370/356 |
| 2009/0034527 | A1* | 2/2009 | Mathieu | H04L 29/06027 370/392 |
| 2009/0088147 | A1* | 4/2009 | Bu | H04L 63/1416 455/423 |
| 2009/0106318 | A1* | 4/2009 | Mantripragada | H04L 63/1408 |
| 2015/0150123 | A1* | 5/2015 | Be'ery | H04L 63/1416 726/22 |

FOREIGN PATENT DOCUMENTS

| | | |
|---|---|---|
| CN | 1838608 A | 9/2006 |
| CN | 1878141 A | 12/2006 |
| EP | 2 418 617 A1 | 2/2012 |
| WO | WO 2006/104752 A1 | 10/2006 |

OTHER PUBLICATIONS

Fabio Ricciato, et al., "A review of DoS attack models for 3G cellular networks from a system-design perspective", Compter Communications, vol. 33, No, 5, Mar. 15, 2010, p. 551-558.

Feng Qian, et al., "Characterizing Radio Resource Allocation for 3G Networks", IMC'10, Nov. 1-3, 2010, p. 137-150.

Feng Qian, et al., "Profiling Resource Usage for Mobile Applications: A Cross-layer Approach", MobiSys' 11, Jun. 28-Jul. 1, 2011, 14 pages.

Ye Yinfa et al., "WCDMA System Engineering Manual", China Machine Press, 2006, 24 pages.

* cited by examiner

METHOD AND APPARATUS FOR ANALYZING SIGNALING TRAFFIC

CROSS-REFERENCE TO RELATED APPLICATIONS

This application is a continuation of International Application No. PCT/CN2013/071089, filed on Jan. 29, 2013, which claims priority to Chinese Patent Application No. CN201210195008.9, filed on Jun. 13, 2012, both of which are hereby incorporated by reference in their entireties.

TECHNICAL FIELD

The present invention relates to the field of wireless communications, and in particular, to a method and an apparatus for analyzing signaling traffic.

BACKGROUND

As a new-generation cellular mobile communications technology, a 3G network has been developing rapidly in recent years with an advantage of a higher data transmission rate. An increase of the data transmission rate allows a communications system to provide more services for a user, and brings a direct and beneficial influence on a communications industry, that is, giving rise to a communications terminal industry, such as a smartphone, and a tablet computer.

To provide a service for a user, a communications terminal needs to transmit a certain number of signaling messages through a wireless network. The more services the communications terminal provides for a user, the more signaling messages need to be transmitted through the wireless network. For example, while the 3G network is providing more services for a user, the number of signaling messages transmitted in a communications system also increases dramatically. In addition, for the design of a conventional IP application and protocol, a subsequent expansion of the 3G network protocol is not taken into a full consideration, so that a large number of extra signaling messages are generated in the communications system, thereby causing a signaling storm. This consumes substantial radio resources, aggravates a communication load and a processing load of a network element device in the communications system, and even affects data transmission.

In a practical application of an existing communications system, an operator needs to know an operating status of the communications system in real time. For example, the operator needs to obtain a traffic value over an air interface in a network through a server on the network side (like a radio network controller (radio network controller, RNC)), so as to monitor signaling traffic in the communications system.

A problem of the prior art is that an existing server on the network side only monitors the signaling traffic in the communications system without further analyzing the signaling traffic. Because of lacking a further analysis on the signaling traffic, an operator is difficult to further process anomaly signaling traffic when the anomaly signaling traffic is generated. In other words, in the prior art, the signaling traffic in the communications system is only monitored without an analysis. Without an analysis result of the signaling traffic, it is impossible to perform a further measure for adjusting the signaling traffic to reduce or eliminate an influence of the signaling storm on the communications system.

SUMMARY

Embodiments of the present invention provide a method and an apparatus for analyzing signaling traffic, which are capable of analyzing signaling traffic and obtaining an analysis result.

To achieve the preceding objective, the embodiments of the present invention adopt the following technical solutions:

In one aspect, an embodiment of the present invention provides a method for analyzing signaling traffic, including:

obtaining the number of signaling messages generated in the process that a terminal device transmits a packet, according to user-plane data of the terminal device, where the user-plane data includes: an interval between packets transmitted by the terminal device or the length of each packet transmitted by the terminal device; and analyzing the number of signaling messages generated in the process that the terminal device transmits a packet and obtaining an analysis result, where the analysis result includes: address information about a terminal device that generates anomaly signaling traffic and/or characteristic information that affects signaling traffic.

In another aspect, an embodiment of the present invention provides an apparatus for analyzing signaling traffic, including:

a recording module, configured to obtain the number of signaling messages generated in the process that a terminal device transmits a packet, according to user-plane data of the terminal device, where the user-plane data includes: an interval between packets transmitted by the terminal device or the length of each packet transmitted by the terminal device; and an analyzing module, configured to analyze the number of signaling messages generated in the process that the terminal device transmits a packet and obtain an analysis result, where the analysis result includes: address information about a terminal device that generates anomaly signaling traffic and/or characteristic information that affects signaling traffic.

Based on the method and apparatus for analyzing signaling traffic that are provided by the embodiments of the present invention, by analyzing a signaling message generated in the process that a terminal device transmits a packet, whether the terminal device is the source of anomaly signaling traffic can be determined, and characteristic information of packets that affect signaling traffic can also be determined at the same time. Compared with the prior art, the present invention is capable of analyzing signaling traffic and finding the source of anomaly signaling traffic and characteristic information that affects signaling traffic.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and embodiments.

Embodiment 1

Figure 1A:
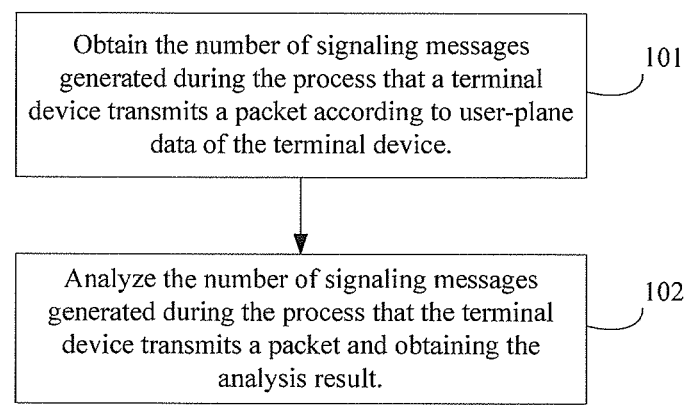
FIG. 1a is a flowchart of a method for analyzing signaling traffic according to Embodiment 1 of the present invention.

An embodiment of the present invention provides a method for analyzing signaling traffic. As shown in FIG. 1a, the method includes:

Step 101: Obtain the number of signaling messages generated in the process that a terminal device transmits a packet, according to user-plane data of the terminal device.

The user-plane data includes: an interval between packets transmitted by the terminal device or the length of each packet transmitted by the terminal device.

Figure 1B:
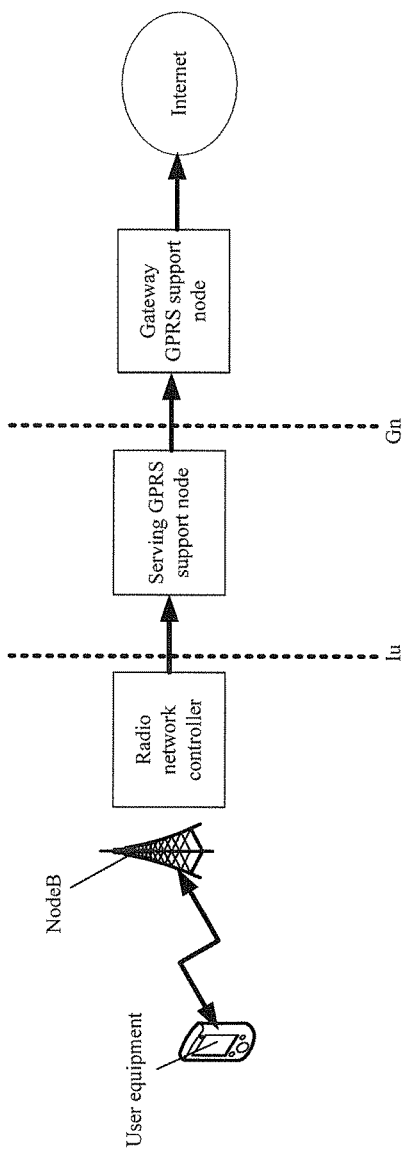
FIG. 1b is a schematic network structural diagram of a specific example according to the present invention.

Specifically, in this embodiment, a server on the network side may capture, through a probe that is deployed over an interface of a network element at each node in a communications system, packets sent by the terminal device. For example:

FIG. 1b shows network architecture of a WCDMA (Wideband Code Division Multiple Access, wideband code division multiple access) network, including basic network elements such as a gateway GPRS (General Packet Radio Service, general packet radio service) support node (Gateway GPRS Support Node, GGSN), a serving GPRS support node (Serving GPRS Support Node, SGSN), a radio network controller, a base station, and a terminal device (UE). IP packets sent by the terminal device pass through the base station, the radio network controller, and the serving GPRS support node, and converge at the gateway GPRS support node, and then are transmitted to the Internet.

In the prior art, an operator may deploy a probe over a Gn interface between a gateway GPRS support node and a serving GPRS support node, or over an Iu interface between a serving GPRS support node and a radio network controller, so as to capture IP packets sent by a terminal device or obtain signaling traffic.

Step 102: Analyze the number of signaling messages generated in the process that the terminal device transmits a packet and obtain an analysis result.

The analysis result includes: address information about a terminal device that generates anomaly signaling traffic and/or characteristic information that affects signaling traffic.

Specifically, in this embodiment, the server on the network side may analyze the number of signaling messages generated in the process that the terminal device transmits a packet and obtain the analysis result. For example:

Based on a threshold value method, the server on the network side may determine whether the number of signaling messages generated in the process that the terminal device transmits a packet is larger than a preset threshold value, so as to determine whether anomaly signaling traffic is generated by the terminal device. The preset threshold value may be either set by a technical person or automatically set by the server on the network side according to the operating condition of the communications system, and no limitation is made herein. Similarly, the server on the network side may process, through the previous method procedure, all terminal devices in the communications system, thereby finding all terminal devices that generate anomaly signaling traffic in the communications system and recording IP addresses of the terminal devices.

For another example, the server on the network side may obtain characteristic information of a packet transmitted by the terminal device, and calculate, by using an existing measure, a signaling generation condition in the process that the terminal device transmits packets with the same characteristic information, so as to select the characteristic information that affects signaling traffic.

Based on the method for analyzing signaling traffic that is provided by this embodiment, a signaling message generated in the process that a terminal device transmits a packet can be analyzed, whether the terminal device is the source of anomaly signaling traffic is determined, and characteristic information of packets that affect signaling traffic can also be determined at the same time. Compared with the prior art, the present invention is capable of analyzing signaling traffic and finding the source of anomaly signaling traffic and characteristic information that affects signaling traffic.

Embodiment 2

Figure 2A:
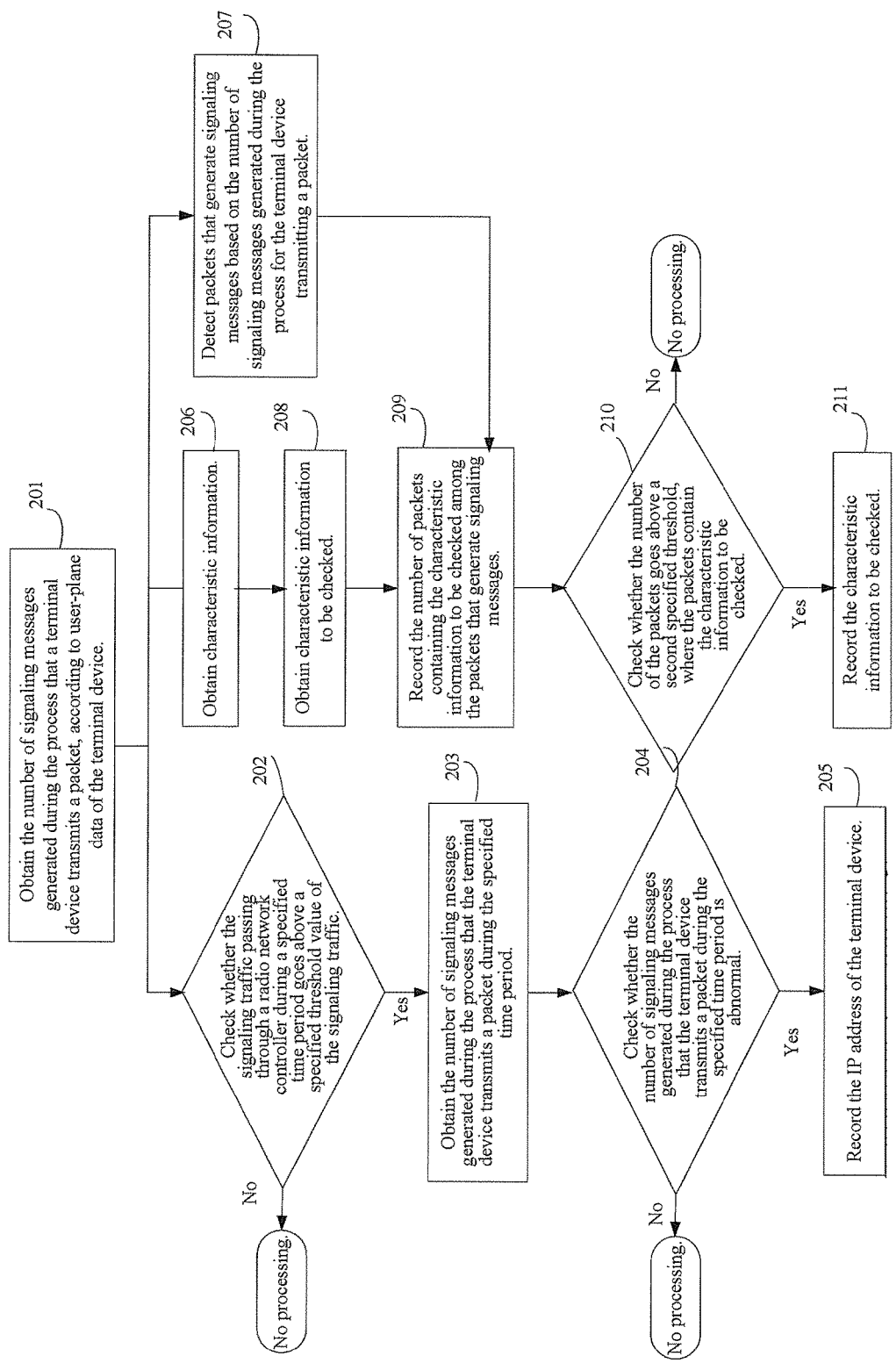
FIG. 2a is a flowchart of a method for analyzing signaling traffic according to Embodiment 2 of the present invention.

An embodiment of the present invention provides a method for analyzing signaling traffic. As shown in FIG. 2a, the method includes:

Step 201: Obtain the number of signaling messages generated in the process that a terminal device transmits a packet, according to user-plane data of the terminal device.

The user-plane data includes: an interval between packets transmitted by the terminal device or the length of each packet transmitted by the terminal device.

In this embodiment, a specific method for a server on the network side to analyze the number of signaling messages generated in the process that the terminal device transmits a packet may include the following two: (1) a method procedure from steps 202 to 205, aiming to determine the source of anomaly signaling traffic; and (2) a method procedure from steps 206 to 211, aiming to obtain characteristic information that affects signaling traffic. These two specific analysis methods may be performed at the same time or according to a certain sequence, which is not limited herein. Moreover, a final analysis result may include: both or either of address information about a terminal device that generates anomaly signaling traffic and the characteristic information that affects signaling traffic.

Step 202: Detect whether signaling traffic passing through a radio network controller during a specified time period is larger than a preset traffic threshold value.

Specifically, as shown in FIG. 1b, a radio network controller is an indispensable device in an existing communications system (like a 3G network). Because both data exchange between a terminal device and a network side and signaling transmission need to pass through the radio network controller, in the prior art, a probe is always deployed over an Iu interface between a serving GPRS support node and the radio network controller, so as to obtain the signaling traffic passing through the radio network controller during the specified time period. When the server on the network side detects overlarge signaling traffic (for example, the signaling traffic is larger than the preset traffic threshold value) passing through the radio network controller during the specified time period, it indicates that the signaling traffic in the communications system is abnormal, and a procedure of subsequent steps is required for a further analysis.

If the signaling traffic passing through the radio network controller during the specified time period is less than or equal to the preset traffic threshold value, no processing is performed.

Step 203: If the signaling traffic passing through the radio network controller during the specified time period is larger than the preset threshold value, obtain the number of signaling messages generated in the process that the terminal device transmits a packet during the specified time period.

Specifically, in this embodiment, the server on the network side may capture a signaling message passing through the radio network controller through an existing probe deployed in the communications system, and find, through an existing technical means (like source address lookup), a terminal device that sends the signaling message, thereby obtaining the number of signaling messages generated in the process that the terminal device transmits a packet during the specified time period.

A radio network controller in the communications system may manage a plurality of terminal devices, where data exchange between the plurality of terminal devices and the network side and signaling transmission all pass through the radio network controller. In step 202, if current signaling traffic passing through the radio network controller is detected to be abnormal, it indicates that at least one of the terminal devices that belong to the radio network controller generates anomaly signaling traffic in the process of transmitting a packet. The method procedure from steps 203 to 205 is a process of determining whether the terminal device is the source of the anomaly signaling traffic. In this embodiment, the server on the network side may perform the method procedure from steps 203 to 205 on all mobile terminals that belong to the radio network controller, so as to find a terminal device that generates the anomaly signaling traffic.

Step 204: Detect whether the number of signaling messages generated in the process that the terminal device transmits a packet during the specified time period is abnormal.

If the number of signaling messages generated in the process that the terminal device transmits a packet during the specified time period is normal, no processing is performed.

Specifically, in this embodiment, there are several ways to detect whether the number of signaling messages is abnormal, including:

Step 2041: Detect whether the number of signaling messages generated in the process that the terminal device transmits a packet during the specified time period is larger than the preset threshold value, where the number of signaling messages is abnormal if it does.

The specified time period may be either set by a technical person or automatically set by the server on the network side according to the operating condition of the communications system, which is not limited herein.

At the mean time, optionally, other common algorithms for anomaly detection may also be used to detect whether the number of signaling messages is abnormal:

Step 2042: Detect whether the number of signaling messages is abnormal based on a preset algorithm for anomaly detection.

The algorithm for anomaly detection includes any one of cumulative sum (CUSUM), wavelet transform (Wavelet transform), and kalman (Kalman) filter.

Specifically, in this embodiment, the algorithm for anomaly detection running on the server on the network side is not limited to the foregoing algorithms, but may also be any algorithm for anomaly detection that is familiar to persons skilled in the art.

Step 205: If the number of signaling messages generated in the process that the terminal device transmits a packet during the specified time period is abnormal, record an IP address of the terminal device.

Specifically, in this embodiment, if the server on the network side determines that the number of signaling messages generated in the process that the terminal device transmits a packet is abnormal through the detection, the server records the IP address of the terminal device, thereby finding the source of the anomaly signaling traffic, so that the server on the network side or a technical person may take a corresponding measure to eliminate or reduce the negative influence of the anomaly signaling traffic on the communications system based on the IP address of the source (terminal device) of the anomaly signaling traffic. This embodiment involves only the procedure of analyzing the anomaly signaling traffic. A specific implementation manner for eliminating or reducing the negative influence of the anomaly signaling traffic on the communications system may be any manner that is familiar to persons skilled in the art, which is not described in detail herein.

Further, optionally, because the anomaly signaling traffic may be generated not only by a terminal device but also caused by other reasons, this embodiment provides a method for analyzing the reasons of generating the anomaly signaling traffic, that is, analyzing characteristic information of a packet and finding the characteristic information that affects signaling traffic, so that the server on the network side or the technical person may further process the anomaly signaling traffic based on the analysis result (the characteristic information that affects signaling traffic). Therefore, the procedure of analyzing the number of signaling messages generated in the process that the terminal device transmits a packet may also include:

Step 206: Obtain characteristic information.

The characteristic information includes any one of an IP address of a packet transmitted by the terminal device, the packet length, and a source port number.

Specifically, in this embodiment, the characteristic information to be analyzed by the server on the network side is not limited to the previous three items, but may also be characteristic information about a packet in an IP layer, a transport layer, an application layer, or the like, such as an IP address, the packet length of a packet, or the like in the IP layer, a source port number or the like in the transport layer, and protocol header information (like HTTP Referer, and HTTP Host) or the like in the application layer.

Step 207: Determine packets that generate signaling messages based on the number of signaling messages generated in the process that the terminal device transmits a packet.

Figure 2B:
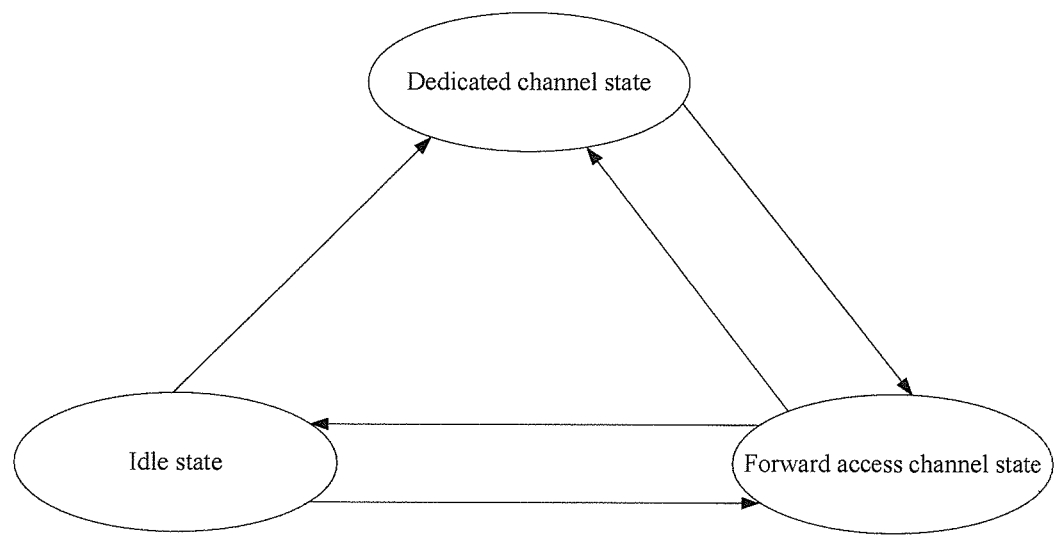
FIG. 2b is a schematic structural diagram of a specific example according to Embodiment 2 of the present invention.

Specifically, in this embodiment, the server on the network side may determine, through an existing technical means, the packets that generate signaling messages. For example, based on a character string in each signaling message for identifying a packet, the server on the network side determines that which packet is transmitted by the terminal device when each signaling message is generated, thereby determining the packets that generate signaling messages during transmission. Specifically, there are many reasons for the packets generating signaling messages during transmission. For example:

In a practical application, the communications system assigns a radio resource control (Radio Resource Control, RRC) state machine to each terminal device, and sets the state of the radio resource control state machine for the terminal device based on a condition (such as a packet transmission rate, the packet length, or the like) about a latest packet transmitted by the terminal device. The state of each radio resource control state machine corresponds to a certain assigned radio resource. In other words, a packet transmitted by each terminal device may cause a state switchover on a radio resource control state machine of the terminal device. During a state switchover on the radio resource control state machine of the terminal device, a certain number of signaling messages are generated. For example:

FIG. 2b shows a radio resource control state machine used by a certain real operating network, where IDLE (idle state) state is a default state after a communications terminal is powered on, occupying no resource; a DCH (Dedicated CHannel, dedicated channel) state and an FACH (Forward Access CHannel, forward access channel) state correspond to that the communications terminal occupies certain resources during transmission. The DCH status indicates that a user is assigned with more radio resources during high-speed data transmission, while the FACH status indicates that a user is assigned with fewer radio resources during low-speed data transmission. When a user performs a state switchover between radio resource control state machines, a certain number of signaling messages are generated between the communications terminal and the radio network controller. In addition, a signaling message relevant to the radio resource control state machine is the major source of signaling traffic over a radio air interface side. Table 1 lists the corresponding number of signaling messages during a state switchover.

TABLE 1

| | | |
|---|---|---|
| IDLE→DCH | | 23 |
| DCH→FACH | | 4 |
| DCH→IDLE | | 8 |
| FACH→DCH | | 10 |
| FACH→IDLE | | 6 |

Step 208: Obtain characteristic information to be detected.

Specifically, in this embodiment, the server on the network side may perform a procedure of steps 209 to 211 on all characteristic information, so as to find all the characteristic information that affects signaling traffic.

The method procedure corresponding to steps 206 to 208 may be performed at the same time with the method procedure corresponding to step 207 or according to a sequence, which is not limited herein.

Step 209: Record the number of packets containing the characteristic information to be detected among the packets that generate signaling messages.

In other words, the server on the network side selects the packets that generate signaling messages and are obtained in step 207 again to obtain the packets containing the characteristic information to be detected, and records the number of the packets containing the characteristic information to be detected.

Step 210: Detect whether the number of the packets containing the characteristic information to be detected is larger than a second preset threshold value.

The second preset threshold value may be either automatically set by the server on the network side or be set by a technical person.

If the number of the packets containing characteristic information to be detected is less than or equal to the second preset threshold value, the characteristic information to be detected is not the characteristic information that affects signaling traffic, and no processing is performed.

Step 211: If the number of the packets containing the characteristic information to be detected is larger than the second preset threshold value, which indicates that the characteristic information to be detected is the characteristic information that affects signaling traffic, record the characteristic information to be detected.

When packets containing the same characteristic information generate a larger number of signaling messages during transmission, the characteristic information may be used as the characteristic information that affects signaling traffic. For example:

If a large number of signaling messages are generated when the terminal device is transmitting a plurality of packets with the same destination port number, a device identified by the destination port number may be one of the reasons causing the anomaly signaling traffic, and the server on the network side or a technical person needs to perform further processing. For example, if a user uses a 3G smartphone for uploading data, packets sent by the smartphone to the network side contain the same destination port number, and if the destination port number is detected as the characteristic information that affects signaling traffic, it indicates that this communications service (data uploading) affects the signaling traffic. If a signaling storm occurs, an operator may further obtain a reason of causing the signaling storm while finding the source of anomaly signaling traffic (in this embodiment, the signaling storm occurs because the user uses the 3G smartphone for uploading data). As a result, in this embodiment, based on the method procedure for analyzing signaling traffic, the server on the network side may not only find the source (terminal device) of the anomaly signaling traffic but also further analyze and obtain a reason of generating the anomaly signaling traffic, so that the server on the network side or a technical person may perform further processing through other technical means based on the source of the anomaly signaling traffic and the reason of generating the anomaly signaling traffic.

This embodiment only involves with the procedure of analyzing the characteristic information. A specific implementation manner for eliminating or reducing the negative influence of the anomaly signaling traffic on the communications system may be any manner that is familiar to persons skilled in the art, which is not described in detail herein.

Based on the method for analyzing signaling traffic that is provided by this embodiment, a signaling message generated in the process that a terminal device transmits a packet can be analyzed, whether the terminal device is the source of anomaly signaling traffic is determined, and characteristic information of packets that affect signaling traffic can also be determined at the same time. Compared with the prior art, the present invention is capable of analyzing signaling traffic and finding the source of anomaly signaling traffic and characteristic information that affects signaling traffic.

Embodiment 3

Figure 3:
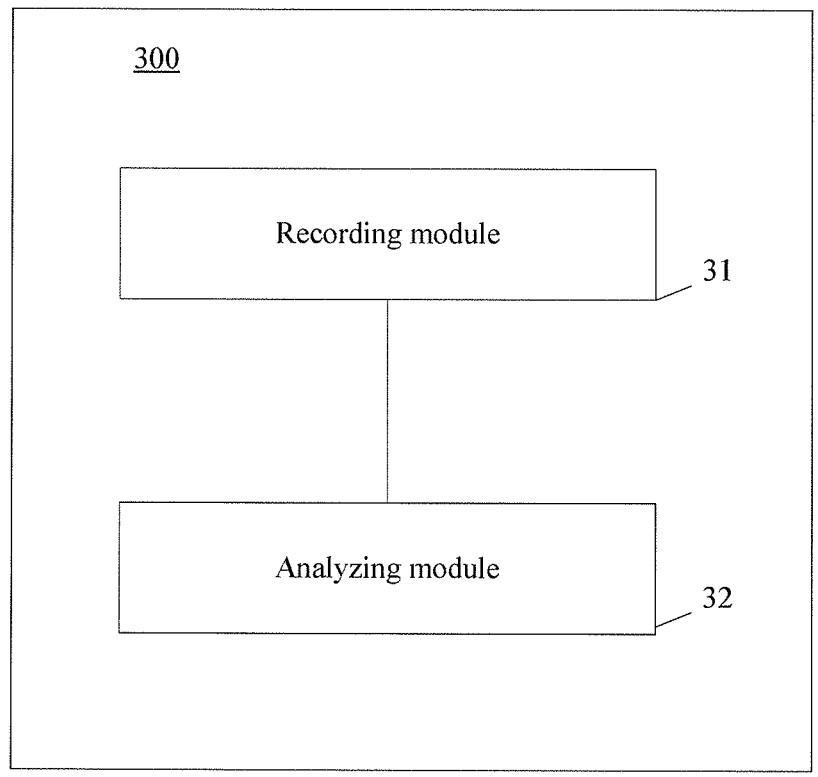
FIG. 3 is a schematic structural diagram of an apparatus for analyzing signaling traffic according to Embodiment 3 of the present invention.

An embodiment of the present invention provides an apparatus for analyzing signaling traffic. As shown in FIG. 3, the apparatus 300 includes:

a recording module 31, configured to obtain the number of signaling messages generated in the process that a terminal device transmits a packet, according to user-plane data of the terminal device, where the user-plane data includes: an interval between packets transmitted by the terminal device or the length of each packet transmitted by the terminal device; and an analyzing module 32, configured to analyze the number of signaling messages generated in the process that the terminal device transmits a packet and obtain an analysis result, where the analysis result includes: address information about a terminal device that generates anomaly signaling traffic and/or characteristic information that affects signaling traffic.

Based on the apparatus for analyzing signaling traffic that is provided by this embodiment, the number of signaling messages generated in the process that a terminal device transmits a packet can be obtained through a recording module, whether the terminal device is a source of anomaly signaling traffic can be determined through an analyzing module, and characteristic information of the packets that affect signaling traffic can also be determined at the same time through the analyzing module. Compared with the prior art, the present invention is capable of analyzing signaling traffic and finding the source of anomaly signaling traffic and characteristic information that affects signaling traffic.

Embodiment 4

Figure 4:
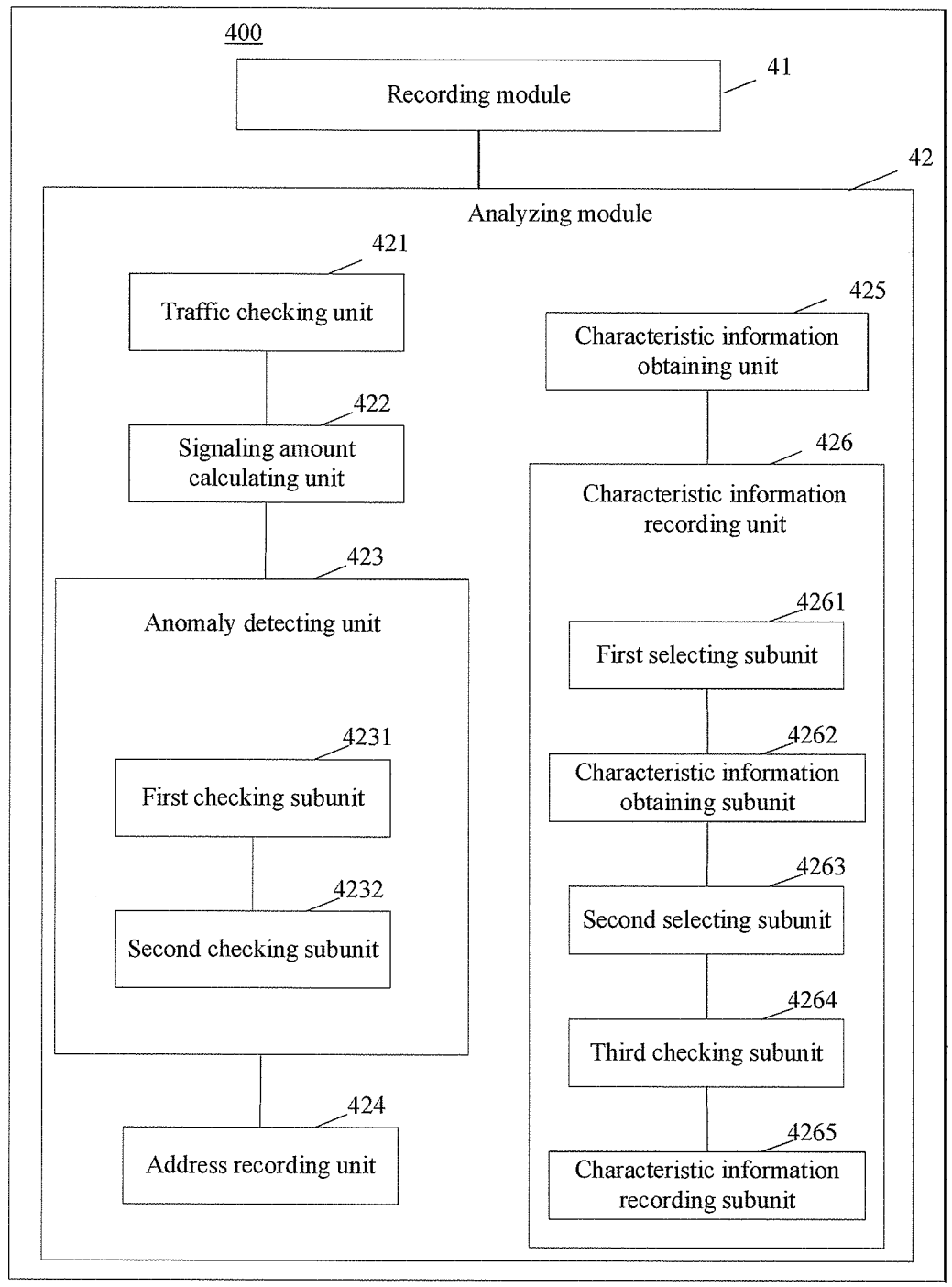
FIG. 4 is a schematic structural diagram of an apparatus for analyzing signaling traffic according to Embodiment 4 of the present invention.

An embodiment of the present invention provides an apparatus for analyzing signaling traffic. As shown in FIG. 4, the apparatus 400 includes:

a recording module 41, configured to obtain the number of signaling messages generated in the process that a terminal device transmits a packet, according to user-plane data of the terminal device, where the user-plane data includes: an interval between packets transmitted by the terminal device or the length of each packet transmitted by the terminal device; and an analyzing module 42, configured to analyze the number of signaling messages generated in the process that the terminal device transmits a packet and obtain an analysis result.

The analyzing module 42 includes:

a traffic detecting unit 421, configured to detect whether signaling traffic passing through the radio network controller during a specified time period is larger than a preset traffic threshold value;

a signaling amount calculating unit 422, configured to: if the signaling traffic passing through the radio network controller during the specified time period is larger than the preset threshold value, obtain the number of signaling messages generated in the process that the terminal device transmits a packet during the specified time period;

an anomaly detecting unit 423, configured to detect whether the number of signaling messages generated in the process that the terminal device transmits a packet during the specified time period is abnormal, where the anomaly detecting unit 423 includes:

a first detecting subunit 4231, configured to detect whether the number of signaling messages generated in the process that the terminal device transmits a packet during the specified time period is larger than the preset threshold value, where the number of signaling messages is abnormal if it does; and a second detecting subunit 4232, configured to detect whether the number of signaling messages is abnormal based on a preset algorithm for anomaly detection, where the algorithm for anomaly detection includes any one of cumulative sum (CUSUM), wavelet transform (Wavelet transform), and kalman (Kalman) filter; and an address recording unit 424, configured to: if the number of signaling messages generated in the process that the terminal device transmits a packet during the specified time period is abnormal, record an IP address of the terminal device.

Further, optionally, the analyzing module 42 further includes:

a characteristic information obtaining unit 425, configured to obtain characteristic information, where the characteristic information includes any one of an IP address of a packet transmitted by the terminal device, the packet length, and a source port number; and a characteristic information recording unit 426, configured to record the characteristic information that affects signaling traffic, where the characteristic information recording unit 426 includes:

a first selecting subunit 4261, configured to determine packets that generate signaling messages based on the number of signaling messages generated in the process that the terminal device transmits a packet;

a characteristic information obtaining subunit 4262, configured to obtain characteristic information to be detected;

a second selecting subunit 4263, configured to record the number of packets containing the characteristic information to be detected among the packets that generate signaling messages;

a third detecting subunit 4264, configured to detect whether the number of the packets containing the characteristic information to be detected is larger than a second preset threshold value; and a characteristic information recording subunit 4265, configured to: if the number of the packets containing the characteristic information to be detected is larger than the second preset threshold value, which indicates that the characteristic information to be detected is the characteristic information that affects signaling traffic, record the characteristic information to be detected.

Based on the apparatus for analyzing signaling traffic that is provided by this embodiment, the number of signaling messages generated in the process that a terminal device transmits a packet can be obtained through a recording module, whether the terminal device is the source of anomaly signaling traffic is determined through an analyzing module, and characteristic information that affects signaling traffic can also be analyzed and determined at the same time through a characteristic information recording unit of the analyzing module. Compared with the prior art, the present invention is capable of analyzing signaling traffic and finding the source of anomaly signaling traffic and characteristic information that affects signaling traffic.

The embodiments in this specification are all described in a progressive manner, mutual reference may be made to the same or similar part of the embodiments, and each embodiment focuses on illustrating a difference from other embodiments. In particular, for the device embodiments, since they are basically similar to the method embodiments, the device embodiments are described simply, and for the relevant part, reference may be made to partial description in the method embodiments.

Persons of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), a random access memory (Random Access Memory, RAM), or the like.

The foregoing descriptions are merely specific implementation manners of the present invention, but are not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A method for analyzing signaling traffic, the method comprising:
    capturing, by a server on a network side through a probe deployed over an interface of a network element in a mobile communication system, packets sent by a terminal device;
    obtaining a number of signaling messages generated by a process in which the terminal device transmits a packet, wherein obtaining the number of signaling messages is in accordance with user-plane data of the terminal device, wherein the user-plane data comprises an interval between packets transmitted by the terminal device or the length of each packet transmitted by the terminal device;
    analyzing the number of signaling messages generated by the process in which the terminal device transmits a packet and obtaining an analysis result, wherein the analysis result comprises characteristic information that affects signaling traffic, wherein the characteristic information comprises any one of an IP address of a packet transmitted by the terminal device, the packet length, and a source port number;
    recording the characteristic information that affects signaling traffic, wherein recording the characteristic information that affects signaling traffic comprises:
        determining packets that generate signaling messages during transmission based on the number of signaling messages generated by the process in which the terminal device transmits a packet, wherein the server on the network side determines which packet is transmitted by the terminal device when each signaling message is generated based on a character string in each signaling message for identifying a packet;
        obtaining packets containing the characteristic information to be detected by selecting the determined packets that generate signaling messages during transmission,
        recording the number of packets containing the characteristic information to be detected among the packets that generate signaling messages,
        detecting whether the number of the packets containing the characteristic information to be detected is larger than a preset threshold value, and
        when the number of packets containing the characteristic information to be detected is larger than the preset threshold value, which indicates that the characteristic information to be detected is the characteristic information that affects signaling traffic, recording the characteristic information to be detected.

2. The method for analyzing signaling traffic according to claim 1, wherein the terminal device is associated with a radio network controller (RNC), the analysis result comprises address information of a terminal device that generates anomaly signaling traffic, and analyzing the number of signaling messages generated by the process in which the terminal device transmits a packet and obtaining an analysis result comprises:
    detecting whether signaling traffic passing through the radio network controller during a specified time period is larger than a second preset threshold value;
    when the signaling traffic passing through the radio network controller during the specified time period is larger than the second preset threshold value, obtaining the number of signaling messages generated by the process in which the terminal device transmits a packet during the specified time period;
    detecting whether the number of signaling messages generated by the process in which the terminal device transmits a packet during the specified time period is abnormal; and
    when the number of signaling messages generated by the process in which the terminal device transmits a packet during the specified time period is abnormal, recording an IP address of the terminal device, thereby identifying the terminal device as a source of the anomaly signaling traffic.

3. The method for analyzing signaling traffic according to claim 2, wherein detecting whether the number of signaling messages generated by the process in which the terminal device transmits a packet during the specified time period is abnormal comprises:
    in response to the number of signaling messages generated by the process in which the terminal device transmits a packet during the specified time period being larger than the second preset threshold value, the number of signaling messages is abnormal.

4. The method for analyzing signaling traffic according to claim 2, wherein detecting whether the number of signaling messages generated by the process in which the terminal device transmits a packet during the specified time period is abnormal comprises:
    detecting whether the number of signaling messages is abnormal based on a preset algorithm for anomaly detection, wherein the preset algorithm for anomaly detection comprises any one of a cumulative sum (CUSUM), a wavelet transform and a kalman filter.

5. An apparatus for analyzing signaling traffic, the apparatus comprising:
    a processor; and memory coupled to the processor, the memory comprising instructions that, when executed by the processor, cause the apparatus to:

capture, through a probe deployed over an interface of a network element in a mobile communication system, packets sent by a terminal device;

obtain a number of signaling messages generated by a process in which the terminal device transmits a packet, wherein obtaining the number of signaling messages is in accordance with user-plane data of the terminal device, wherein the user-plane data comprises an interval between packets transmitted by the terminal device or the length of each packet transmitted by the terminal device;

analyze the number of signaling messages generated by the process in which the terminal device transmits a packet and obtain an analysis result, wherein the analysis result comprises characteristic information that affects signaling traffic, wherein the characteristic information comprises any one of an IP address of a packet transmitted by the terminal device, the packet length, and a source port number;

record the characteristic information that affects signaling traffic, wherein recording the characteristic information that affects signaling traffic comprises:

determining packets that generate signaling messages during transmission based on the number of signaling messages generated by the process in which the terminal device transmits a packet, determining which packet is transmitted by the terminal device when each signaling message is generated based on a character string in each signaling message for identifying a packet;

obtaining packets containing the characteristic information to be detected by selecting the determined packets that generate signaling messages during transmission, recording the number of packets containing the characteristic information to be detected among the packets that generate signaling messages, detecting whether the number of the packets containing the characteristic information to be detected is larger than a preset threshold value, and when the number of packets containing the characteristic information to be detected is larger than the preset threshold value, which indicates that the characteristic information to be detected is the characteristic information that affects signaling traffic, recording the characteristic information to be detected.

6. The apparatus for analyzing signaling traffic according to claim 5, wherein the terminal device is associated with a radio network controller, further comprising instructions that, when executed by the processor, cause the apparatus to:

detect whether signaling traffic passing through the radio network controller during a specified time period is larger than a preset traffic threshold value;

when the signaling traffic passing through the radio network controller during the specified time period is larger than the preset traffic threshold value, obtain the number of signaling messages generated by the process in which the terminal device transmits a packet during the specified time period;

detect whether the number of signaling messages generated by the process in which the terminal device transmits a packet during the specified time period is abnormal; and when the number of signaling messages generated by the process in which the terminal device transmits a packet during the specified time period is abnormal, record an IP address of the terminal device, thereby identifying the terminal device as a source of anomaly signaling traffic.

7. The apparatus for analyzing signaling traffic according to claim 6, further comprising instructions that, when executed by the processor, cause the apparatus to:

in response to the number of signaling messages generated by the process in which the terminal device transmits a packet during the specified time period being larger than the preset traffic threshold value, the number of signaling messages is abnormal.

8. The apparatus for analyzing signaling traffic according to claim 6, further comprising instructions that, when executed by the processor, cause the apparatus to:

detect whether the number of signaling messages is abnormal based on a preset algorithm for anomaly detection, wherein the algorithm for anomaly detection comprises any one of a cumulative sum, a wavelet transform and a kalman filter.

* * * * *